United States Patent
Kira et al.

(10) Patent No.: US 8,416,372 B2
(45) Date of Patent: Apr. 9, 2013

(54) DISPLAY DEVICE

(75) Inventors: Syuuichi Kira, Tokyo (JP); Hisatomo Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 12/955,427

(22) Filed: Nov. 29, 2010

(65) Prior Publication Data

US 2011/0141386 A1   Jun. 16, 2011

(30) Foreign Application Priority Data

Dec. 16, 2009  (JP) ................................. 2009-284930

(51) Int. Cl.
*G02F 1/133514* (2006.01)
(52) U.S. Cl. ........................................ 349/106; 349/108
(58) Field of Classification Search ........................ None
See application file for complete search history.

(56) References Cited

U.S. PATENT DOCUMENTS

| 2006/0120160 | A1 | 6/2006 | Park et al. | |
| 2008/0068516 | A1* | 3/2008 | Mori et al. | 348/790 |
| 2009/0073358 | A1* | 3/2009 | Taguchi et al. | 349/109 |

FOREIGN PATENT DOCUMENTS

| JP | 2006-79104 | 3/2006 |
| JP | 2008-70763 | 3/2008 |

* cited by examiner

*Primary Examiner* — Thanh-Nhan P Nguyen
(74) *Attorney, Agent, or Firm* — Oblon, Spivak, McClelland, Maier & Neustadt, L.L.P.

(57) ABSTRACT

The display device according to the present invention has a pixel, a TFT, a BM, and a colorant. A plurality of pixels are arranged in a matrix. The TFT is placed in the pixel. There are two kinds of positions of the TFT in the pixel. The position is common in each column. The BM has an aperture area and a TFT light-shielding part in the pixel. The TFT light-shielding part is placed to counter the TFT. The colorant is placed in the aperture area. Further, there are two or more kinds of the colors of the colorant. The color is common in each column. The shapes of the aperture areas in which the same color colorants are placed are the same.

7 Claims, 6 Drawing Sheets

DISPLAY DEVICE

INCORPORATION BY REFERENCE

This application is based upon and claims the benefit of priority from Japanese patent application No. 2009-284930, filed on Dec. 16, 2009, the disclosure of which is incorporated herein in its entirety by reference.

BACKGROUND OF THE INVENTION

1. Field of the Invention The present invention relates to a display device.

2. Description of Related Art

In recent years, as disclosed in Japanese Unexamined Patent Application Publication Nos. 2006-079104 and 2008-070763, the development of the technique called double scanline style is progressing. In a liquid crystal display of the double scanline style, one video signal line is placed per two adjacent pixels for a plurality of pixels arranged in a row in an extended direction of a scan signal line. Then, two scan signal lines are respectively placed to sandwich the pixels arranged in a row. Thus, the number of video signal lines per pixel can be reduced by half. Additionally, it is possible to reduce the number of parts such as a video signal IC that drives the video signal lines, and thereby reducing the cost of the liquid crystal display.

A liquid crystal display of the double scanline style disclosed in Japanese Unexamined Patent Application Publication No. 2008-070763 is explained with reference to FIG. 9. FIG. 9 is a schematic circuit diagram showing a circuit configuration of the liquid crystal display disclosed in Japanese Unexamined Patent Application Publication No. 2008-070763. In FIG. 9, only the necessary parts of FIG. 9A of Japanese Unexamined Patent Application Publication No. 2008-070763 are illustrated.

As shown in FIG. 9, pixels 13, in which the gate of TFTs 10 are connected to first scan signal lines 11, and pixels 13, in which the gate of the TFT 10s are connected to second scan signal lines 12, are alternately arranged along the x-axis direction. In other words, the position of the TFT 10 in the pixel 13 varies from column to column. This applies to the liquid crystal display of the double scanline style disclosed in Japanese Unexamined Patent Application Publication No. 2006-079104.

SUMMARY OF THE INVENTION

Usually, the TFT part is not utilized for display, and it is shielded from light. For example, in FIGS. 11 and 12 of Japanese Unexamined Patent Application Publication No. 2006-079104, the shaded part is covered by a light-shielding member, and a TFT is included in the shaded part. As mentioned above, since the position of the TFT in the pixel varies from column to column, the region to shield the TFT part from light also varies from column to column.

Generally in a color liquid crystal display device, colors are displayed with three colors of Red (R), Green (G), and Blue (B) as one unit. FIG. 10 is a plan view showing a configuration of a black matrix (BM) and colorants for explaining a single color display state of Green. In FIG. 10, the pixels 13 displayed at the time of the single color display of Green are shown in white.

As shown in FIG. 10, an aperture area 15 is placed in a BM 14 to correspond to the pixel 13. The TFT part is shielded from light by the BM 14. As mentioned above, in the color liquid crystal display of the double scanline style, the position of the TFT in the pixel 13 varies from column to column. Therefore, the region shielding the TFT part from light also varies from column to column. Specifically, the pixels 13 with different shapes of the aperture areas 15 are alternately arranged in each column. Further, in the aperture areas 15, the colorants 16 of Red, Green, and Blue are arranged in every column. Therefore, as shown in FIG. 10, in the pixel 13 displayed at the time of the single color display of Green, the shape of the aperture area 15 varies from column to column. The present inventors have found a problem that, as a result, there has been a problem that, at the time of the single color display, a streak (luminance nonuniformity) along the direction indicated by the dotted line in FIG. 10 (oblique direction) can be more visible, and thereby reducing the display quality. Moreover, in the product in which the shape of the aperture area changes at a certain cycle other than the case in which the shapes of the aperture area alternately change by column, luminance nonuniformity of a specific pattern can be visible, and there is fear that the display quality is reduced in a similar manner.

The present invention is made in order to solve the above problems, and an object is to provide a display device with excellent display quality.

An exemplary aspect of the present invention is a display device that includes a plurality of pixels that are arranged in a matrix, a switching device that is placed in the pixel, in which the switching device includes two or more kinds of positions in the pixel, and the position is common in each column, a light-shielding film including an aperture area and a switching device light-shielding part placed to counter the switching device in the pixel, and a colorant that is placed in the aperture area, in which the colorant includes two or more kinds of colors, and the color is common in each column. Further, the shape of the aperture area in which the same color colorant is placed is same.

The present invention can provide a display device with excellent display quality.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
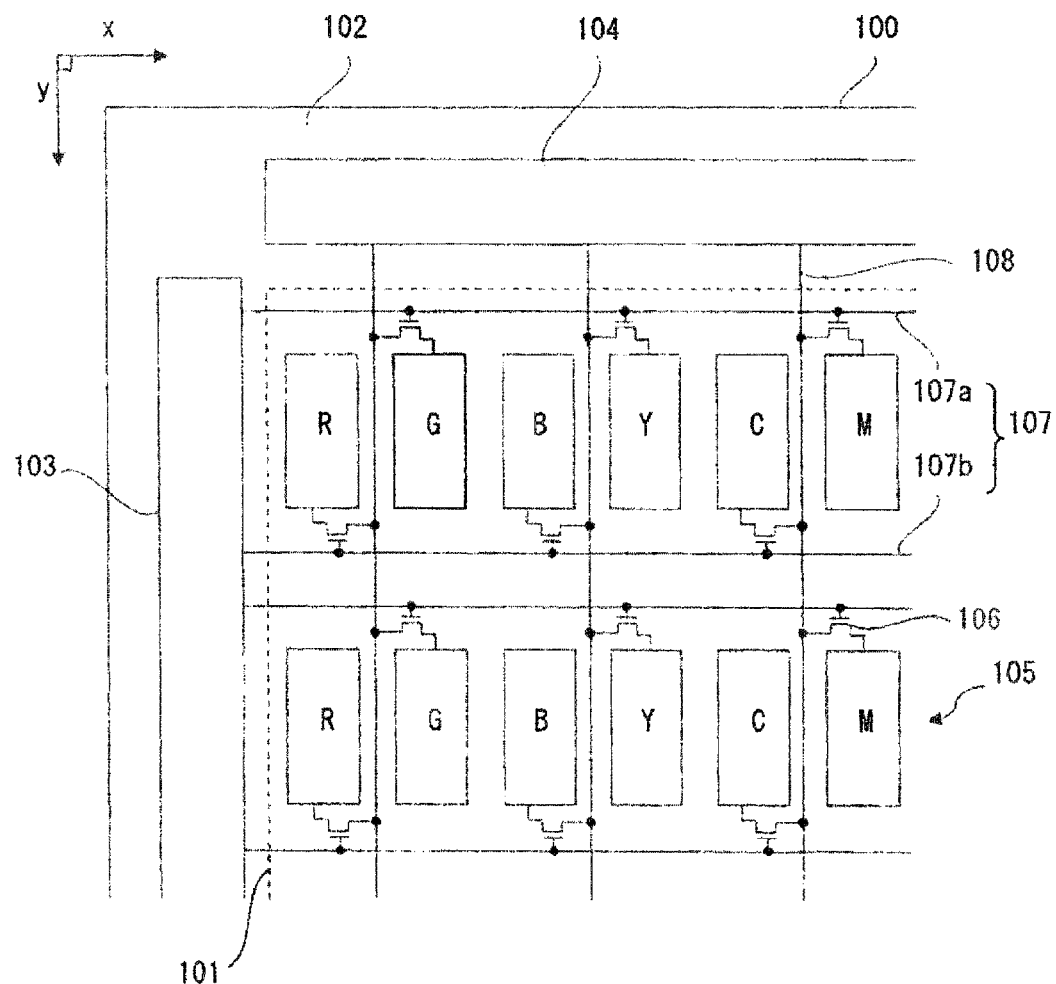
FIG. 1 is a circuit pattern diagram showing a circuit configuration of a liquid crystal display according to a first exemplary embodiment.

Hereinafter, exemplary embodiments of the present invention are described with reference to the drawings. The following descriptions and the drawings are omitted or simplified as appropriate for the clarity of the explanation. Further, for the clarity of the explanation, duplicated explanations are omitted as necessary. Note that the components denoted by identical numerals indicate the same components in the drawings, and the explanations are omitted as appropriate.

First Exemplary Embodiment

A display device according to this exemplary embodiment is explained with reference to FIG. 1. In this example, a liquid crystal display is used as an example of a display device, but it is merely an example. Other flat panel displays, such as an organic EL display device, may be used as the display device. Further, although a thin film transistor (TFT) is used as an example of a switching device, other switching devices than TFT may be used. FIG. 1 is a circuit pattern diagram showing a circuit configuration of the liquid crystal display.

The liquid crystal display includes a TFT substrate 100. The TFT substrate 100 is a TFT array substrate in which TFTs 106 are arranged in array, for example.

The TFT array substrate 100 includes a display region 101 and a frame area 102 sectioned outside of the display region 101. A plurality of gate lines (scan signal lines) 107 and a plurality of source lines (video signal lines) 108 are formed in the display area 101.

The gate lines 107 are arranged in parallel. There are a first gate line 107a and a second gate line 107b for the gate lines 107. The first gate line 107a and the second gate line 107b are alternately arranged. Accordingly, the second gate line 107b is placed between two of the first gate lines 107a. The source lines 108 are arranged in parallel. The gate line 107 and the source line 108 are formed to cross each other. The gate line 107 and source line 108 are perpendicular to each other. In FIG. 1, the gate lines 107 extend in the x-axis direction, and the source lines 108 extend in the y-axis direction. Note that the x and y axes are perpendicular to each other.

The pixels 105 are arranged in a matrix in the display area 101. In this example, the position of the pixel 105, which is located at ith pixel in the x-axis direction and jth pixel in the y-axis direction, is represented by (i, j). Therefore, in FIG. 1, the position of the leftmost pixel 105 is (1, 1). Further, i=1 to m and j=1 to n. That is, in the display area 101, m pixels 105 are arranged in the x-axis direction (row direction) and n pixels 105 are arranged in the y-axis direction (column direction).

Two gate lines 107 are placed between the adjacent pixels 105 in the y-axis direction. Specifically, one each of the first gate line 107a and the second gate line 107b are arranged between the adjacent pixels 105 in the y-axis direction. In other words, the first gate line 107a and the second gate line 107b are respectively formed to sandwich the m pixel 105 that forms each column.

Further, one source line 108 is placed for two pixels 105 between the adjacent pixels 105 in the x-axis direction. Specifically, two pixels 105 are aligned in the x-axis direction between the adjacent source lines 108. In other words, the source line 108 is placed to separate the pixels 105 by two columns. Thus, the liquid crystal display in this exemplary embodiment is a double scanline style having 2 n gate lines 107 and m/2 source lines 108.

Furthermore, a scan signal drive circuit 103 and a video signal drive circuit 104 are placed in the frame area 102 of the TFT substrate 100. The gate line 107 extends from the display area 101 to the frame area 102. Moreover, the gate line 107 is connected to the scan signal drive circuit 103 at an edge of the TFT substrate 100. Similarly, the source line 108 extends from the display area 101 to the frame area 102. Then, the source line 108 is connected to the video signal drive circuit 104 at an edge of the TFT substrate 100. An external line is connected near the scan signal drive circuit 103. Another external line is connected near the video signal drive circuit 104. The external line is a wiring board, such as a FPC (Flexible Printed Circuit).

Various signals are externally supplied to the scan signal drive circuit 103 and video signal drive circuit 104 via the external lines. The scan signal drive circuit 103 supplies a gate signal (scan signal) to the gate line 107 according to a control signal supplied from the outside. The gate lines 107 are sequentially selected by the gate signal. The video signal drive circuit 104 supplies a video signal to the source line 108 according to the control signal and video data supplied from the outside. Accordingly, a video voltage corresponding to the video data can be supplied to each pixel 105. Note that the scan signal drive circuit 103 and the video signal drive circuit 104 are not limited to the configuration in which they are placed over the TFT substrate 100. For example, the drive circuit may be connected by TCP (Tape Carrier Package).

At least one TFT 106, and a pixel electrode and a storage capacitor connected to the TFT 106 are formed in the pixel 105. The TFT 106, the pixel electrode, and the storage capacitor are connected in series in the pixel 105.

In this exemplary embodiment, there are two kinds of the position of the TFT 106 in the pixel 105. Specifically, the TFT 106 is placed near the intersection of the source line 108 and the first gate line 107a, or near the intersection of the source line 108 and the second gate line 107b. The positions of the TFTs 106 in the pixels 105 are common in each column. Specifically, the position of the TFT 106 in the pixels 105 will be the same if i in the pixel (i, j) is the same. Further, the position of the TFT 106 in the pixel 105 periodically changes by the unit of two columns. Note that the position of the TFT 106 here indicates the position of the individual TFT 106 if one TFT 106 is included in the pixel 105 as in this exemplary embodiment. However if a plurality of the TFTs 106 are included in the pixel 105, the position of the TFT 106 indicates a combination of the positions of all the TFTs 106 in the pixel 105 instead of the position of the individual TFT 106 in the pixel 105.

In FIG. 1, the TFTs 106 of the pixels 105 in the odd columns (i=1, 3, ... ) are placed near the intersection of the source line 108 and the second gate line 107b. Accordingly, the TFT 106 is placed at the lower right part of the pixel 105. Further, the TFTs 106 of the pixels 105 in the even columns (i=2, 4, ... ) are placed near the intersection of the source line 108 and the first gate line 107a. Accordingly, the TFT 106 is placed at the upper left part of the pixel 105. Thus, the position of the TFT 106 in the pixel 105 varies from column to column. Specifically, the position of the TFT 106 in the pixel 105 is different in the odd and even columns.

For example, the TFT 106 will be a switching device that supplies the video voltage to the pixel electrode. The gate electrode of the TFT 106 is connected to the gate line 107, and the gate signal supplied from a gate terminal controls to turn on and off the TFT 106. The source electrode of the TFT 106 is connected to the source line 108. If the voltage is applied to the gate electrode to turn on the TFT 106, a current will flow from the source line 108. Then, the video voltage is applied to the pixel electrode connected to a drain electrode of the TFT 106 from the source line 108. Accordingly, an electric field according to the video voltage is generated between the pixel electrode and a counter electrode.

The TFTs 106 of m pixels 105 in the rows are alternately connected to the first gate line 107a and the second gate line 107b, which sandwich these pixels 105. In other words, the TFTs 106 of m/2 pixels 105 are connected to one gate line 107. The TFTs 106 of n pixels 105 in the columns are connected to either the first gate line 107a or the second gate line 107b. In FIG. 1, the TFTs 106 of all the pixels 105 in the odd columns are connected to the second gate line 107b. Further, the TFTs 106 of all the pixels 105 in the even columns are connected to the first gate line 107a.

The TFTs 106 of the two adjacent pixels 105 in the x-axis direction are connected to one source line 108, which is sandwiched by these pixels 105. Specifically, the TFTs 106 of all the pixels 105 that sandwich the source line 108 and aligned by two columns are connected to the same source line 108. In other words, the TFTs 106 of 2 n pixels 105 are connected to one source line 108. In FIG. 1, the TFTs 106 of the pixels 105 of the first (i=1) and the second (i=2) columns are connected to the same source line 108, which is sandwiched by these pixels 105. Moreover, the TFTs 106 of the pixels 105 of the third (i=3) and the fourth (i=4) columns are connected to the source line 108, which is adjacent to the above source line 108.

On the other hand, the storage capacitor is electrically connected to the counter electrode via a storage capacitor line. Therefore, the storage capacitor is connected in parallel to the capacitance between the pixel electrode and the counter electrode. The voltage applied to the pixel electrode by the storage capacitor can be held for certain time. An alignment film for aligning liquid crystal is formed over the surface of the TFT substrate 100. The TFT substrate 100 is configured as described above.

In the case of the liquid crystal display, a counter substrate is placed to the TFT substrate 100. The counter substrate is a color filter substrate, for example, and is placed at a viewing side. A black matrix (BM) and colorants are formed to the counter substrate. The details of the BM and the colorants are described later. Further, the counter electrode is formed to cover the BM and the colorants. The counter electrode is formed to a substantially entire surface of the display area 101. A transparent conductive film, such as ITO, can be used as the counter electrode. The counter electrode is electrically connected to a transfer electrode provided to the TFT substrate 100 side via a transfer material. The signal externally supplied is transferred to the counter electrode via the transfer electrode and the transfer material. Note that for example, in the case of an in-plane switching mode liquid crystal display, the counter electrode is placed to the TFT substrate 100 side and not the counter substrate side. Further, an alignment film for aligning the liquid crystal is formed over the surface of the counter substrate. The counter substrate is configured as described above.

Moreover, a liquid crystal layer is held between the TFT substrate 100 and the counter substrate. Specifically, the liquid crystal is filled between the TFT substrate 100 and the counter substrate. Further, a polarizer plate, a retarder or the like are placed to the surface outsides of the TFT 100 substrate and the counter substrate. A backlight unit or the like is placed to a non-viewing side of the liquid crystal panel configured as above.

The liquid crystal is driven by the electric field between the pixel electrode and the counter electrode. That is, the alignment direction of the liquid crystal between the substrates changes. Then, the polarization state of the light passing through the liquid crystal layer is changed. Specifically, the light from the backlight unit turns into the linear polarized light by the polarizer plate of the TFT substrate 100 side. The linear polarized light pass through the liquid crystal layer, thereby the polarization state is changed.

Therefore, the amount of light passing through the polarizer plate of the counter substrate side changes according to the polarization state. Accordingly, the amount of light which passes through the polarizer plate of the viewing side changes among the transmitted light transmitting the liquid crystal display panel from the backlight unit. The alignment direction of the liquid crystal changes by the applied video voltage. Therefore, the amount of light passing through the polarizer plate of the viewing side can be changed by controlling the video voltage. Thus, a desired image can be displayed by varying the video voltage from pixel to pixel. Note that by forming an electric field in parallel to the electric field between the pixel electrode and the counter electrode in the storage capacitor in the series of operations, it makes a contribution to retain the video voltage.

Figure 2:
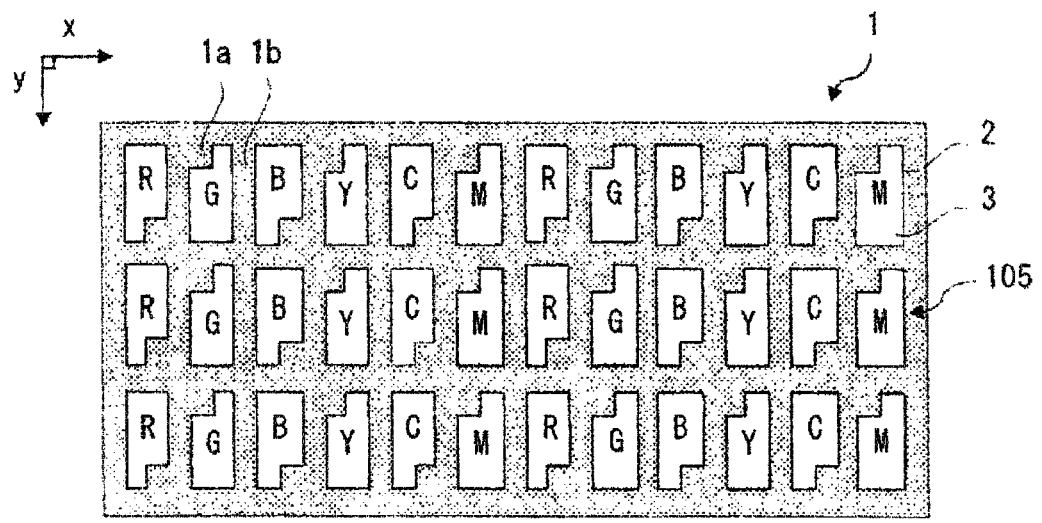
FIG. 2 is a plan view showing a configuration of a BM and colorants according to the first exemplary embodiment.

Next, the BM and the colorants formed to the counter substrate are described in detail with reference to FIG. 2. FIG. 2 is a plan view showing a configuration of a BM 1 and colorants 3.

The BM 1 is placed to the counter substrate as a light-shielding film. The materials of the BM 1 having light-shielding effect and surface low reflectance properties are preferable. For example, a metal oxide material such as chrome oxide, and a black resin material dispersed with carbon black (carbon black pigment) and titanium black (titanium black pigment) in a photosensitive resin can be used as the material of the BM 1.

In the pixel 105, a TFT light-shielding part 1a and a wiring light-shielding part 1b are included as the BM 1, and an aperture area 2 is further included. Specifically, a plurality of the aperture areas 2 are provided in a matrix in a similar way as the pixels 105. The TFT light-shielding part 1a as a switching device light-shielding part is placed to counter the TFT 106. In other words, the TFT light-shielding part 1a is placed to overlap the TFT 106 of the TFT substrate 100 when viewed from above. The TFT part is shielded from light by the TFT light-shielding part 1a.

The wiring light-shielding part 1b is placed to counter the gate line 107 and source line 108. In other words, the wiring light-shielding part 1b is placed to overlap the gate line 107 and the source line 108 of the TFT substrate 100 when viewed from above. The wiring part is shielded from light by the wiring light-shielding part 1b. By providing such BM 1, light slipping from the wiring part or the TFT part of the TFT substrate 100 and light leakage due to abnormal alignment can be shielded.

In this exemplary embodiment, as described above, there are two kinds of the positions of the TFT 106 in the pixel 105, which are different in the odd and even columns. Therefore, there are two kinds of the positions of the TFT light-shielding part 1a placed corresponding to the TFT 106 in the pixel 105, which are different in the odd and even columns. The wiring light-shielding part 1b is formed in a grid to surround each pixel 105. Specifically, the wiring light-shielding part 1b is placed corresponding to the gate line 107 and the source line 108. Further, the wiring light-shielding part 1b is also placed between the pixels 105 in which the source line 108 is not placed. As shown in FIG. 1, the source lines 108 are not placed between the pixels 105 of the second (i=2) and third (i=3) columns, however the wiring light-shielding part 1b is provided also in this part in a similar manner as the wiring light-shielding part 1b, which is placed to correspond to the source line 108.

Since there are two kinds of the positions of the TFT light-shielding part 1a in the pixel 105, there are also two kinds of the shape of the aperture area 2 surrounded by the TFT light-shielding part 1a and the wiring light-shielding part 1b. Specifically, in this exemplary embodiment, the shapes of the aperture area 2 are different in the odd and even columns. In FIG. 2, the aperture area 2 of the odd column is a rectangular shape with the lower right corner clipped. Further, the aperture area 2 of the even column is a rectangular shape with the upper left corner clipped. Accordingly, the aperture area 2 of the even column has a shape of the aperture area 2 of the odd column rotated by 180 degrees. In this specification, the same shape indicates the same shape without rotation. Accordingly, the shape of the aperture area 2 of the odd column and the shape of the aperture area 2 of the even column are different in FIG. 2.

The colorants 3 made of pigment, dye, or resin dispersed with the pigment and dye are placed in the aperture areas 2. The colorant 3 functions as a color filter.

Further, as the shape of the aperture area 2 periodically changes by the unit of two columns, the colorant 3 in multiples of two, which is even number of colors, may be used. In this example, as shown in FIG. 2, the kinds of the colorant 3 used are six colors of Red (R), Green (G), Blue (B), Yellow (Y), Cyan (C), and Magenta (M). Then, the colorant 3 are arranged by column in the order of Red, Green, Blue, Yellow, Cyan, and Magenta. More specifically, the first column is Red, the second column is Green, . . . , and the sixth column is Magenta. The colorants 3 are arranged in a way that the same sequence is repeated from the seventh to mth column.

As the shapes of the aperture areas 2 periodically change by the unit of two columns and the kinds of the colorants 3 change by the unit of six columns, which is a multiple of two columns, the shapes of all the aperture areas 2 in which the same color colorants 3 are placed will be the same. Accordingly, in the pixels 105 in which the same color colorants 3 are placed, the positions of all the TFT light-shielding parts 1a in the pixels 105 are the same. The BM 1 and the colorant 3 are configured as described above.

Figure 3:
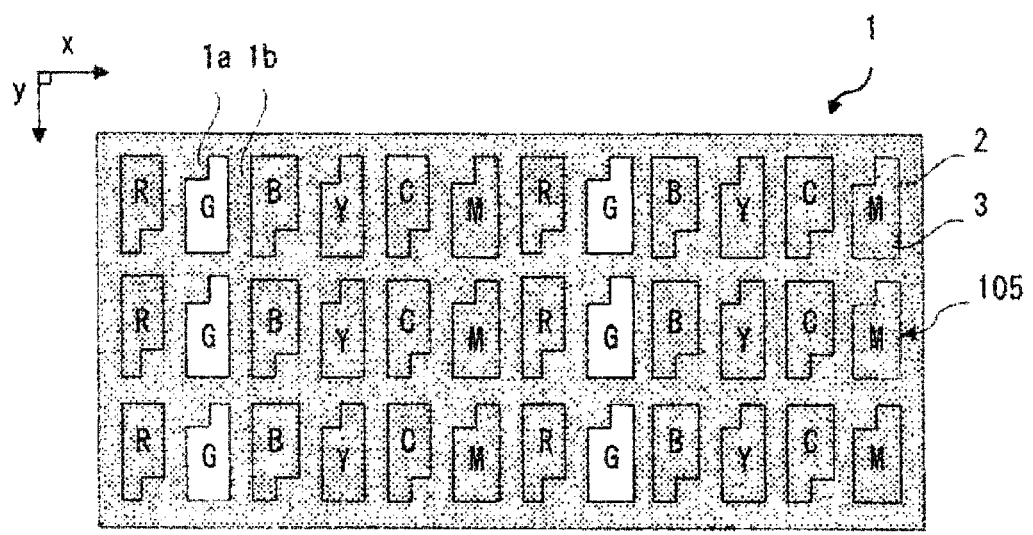
FIG. 3 is a plan view showing a configuration of the BM and the colorants for explaining a single color display state of Green according to the first exemplary embodiment.

In this exemplary embodiment, the shapes of the aperture area 2 in which the same color colorants 3 are placed can be the same. Therefore, if single color is displayed, the shapes of the aperture areas 2 of the displayed pixels 105 can be the same. FIG. 3 is a plan view showing a configuration of the BM 1 and the colorants 3 for explaining the single color display state of Green. In FIG. 3, the pixels 105 displayed at the time of the single color display of Green are shown in white. As shown in FIG. 3, at the time of the single color display of Green, the pixels 105 of the second and eighth columns are displayed. That is, the pixels 105 of the odd columns are not displayed, but only the pixels 105 of the even columns are displayed. Therefore, the shapes of the aperture areas 2 of the displayed pixels 105 will be the same. Thus the positions of the TFT light-shielding parts 1a in the displayed pixels 105 will be the same. Accordingly, an oblique streak (luminance nonuniformity) becomes less visible, and thereby improving the display quality.

Figure 10:
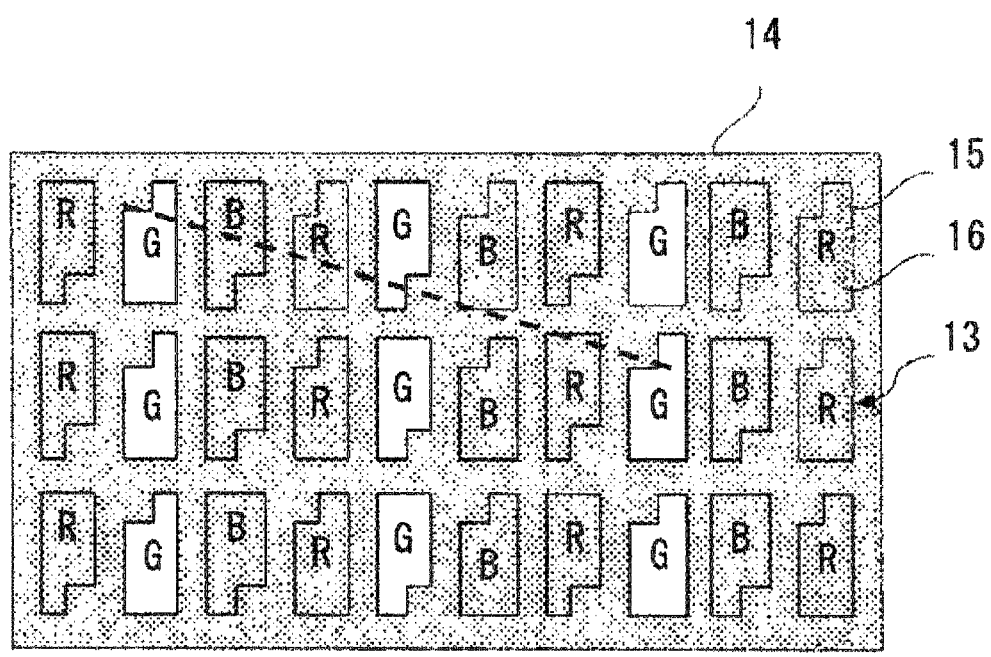
FIG. 10 is a plan view showing a configuration of the BM and the colorants for explaining a single color display state of Green according to the related art.

On the other hand, in the related art as shown in FIG. 10, the pixels 13 of the second, fifth, and eighth columns are displayed at the time of the single color display of Green. That is, the pixels 13 of both the even and the odd columns are displayed. Therefore, the shapes of all the aperture areas 15 of the displayed pixels 13 will not be the same. Therefore, as shown in the dotted line of FIG. 10, the oblique streak becomes visible.

Figure 4:
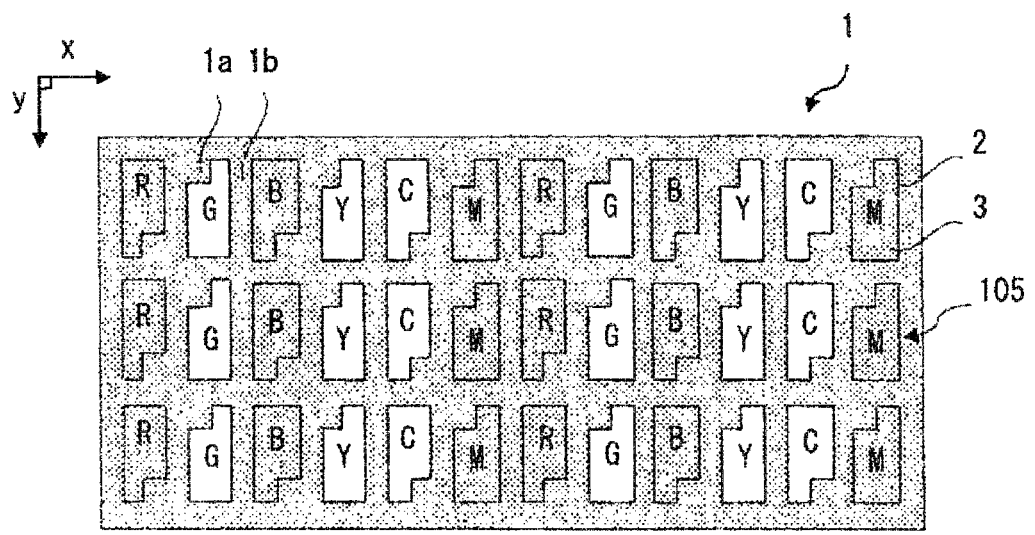
FIG. 4 is a plan view showing a configuration of the BM and the colorants for explaining a multiple color display state according to the first exemplary embodiment.

In this exemplary embodiment, by the adjustment of the color balance of six colors of Red, Green, Blue, Yellow, Cyan, and Magenta, better color reproducibility of middle colors can be achieved as compared to the case of three colors of Red, Green, and Blue. In this exemplary embodiment, the colors can be expressed by combining Yellow, Cyan, and Magenta, in addition to Red, Green, and Blue. FIG. 4 is a plan view showing the BM 1 and the colorants 3 for explaining a multiple color display state. In FIG. 4, the pixels 105 displayed at the time of the multiple color display are shown in white. As shown in FIG. 4, the colors can be expressed by combining Green, Yellow, and Cyan, for example. Therefore, it is possible to achieve better color reproducibility of middle colors as compared to the three colors of Red, Green, and Blue.

Second Exemplary Embodiment

In the first exemplary embodiments, the kinds of the colorants 3 used are six colors of Red, Green, Blue, Yellow, Cyan, and Magenta. In this exemplary embodiment, the kinds of the colorants used shall be four colors of Red, Green, Blue, and White (W). Note that the other configuration is the same as the first exemplary embodiment.

Figure 5:
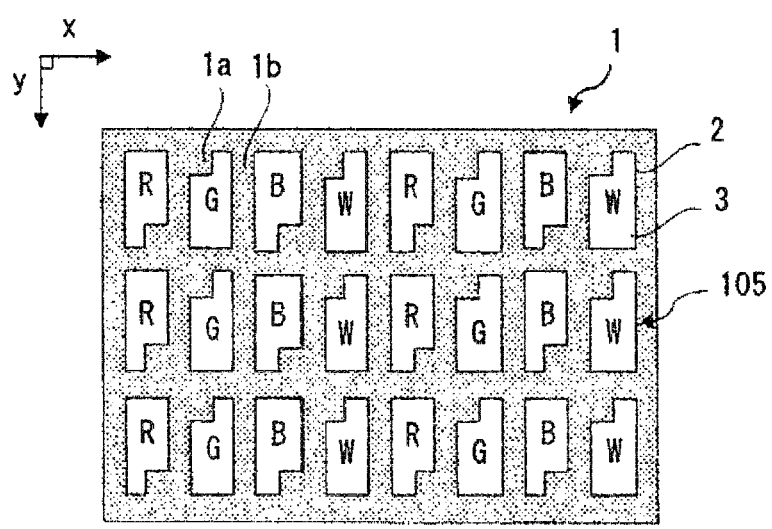
FIG. 5 is a plan view showing a configuration of a BM and colorants according to a second exemplary embodiment.

A liquid crystal display according to this exemplary embodiment is explained with reference to FIG. 5. FIG. 5 is a plan view showing a configuration of a BM 1 and the colorants 3. In this exemplary embodiment, the colorants 3 of four colors, Red, Green, Blue, and White are used. A transparent resin may be used as the White colorant 3. Specifically, a resin not including a pigment or dye may be used as the White colorant 3. Alternatively, as the White colorant 3 only needs to be transparent, nothing may be placed in the aperture area of White. More specifically, the colorant including the transparent resin may not be placed in the aperture area 2 of White. In this case, in the White pixels 105 which function as color filters of White, a transparent component such as a glass substrate of the counter substrate is considered as a White colorant. Then the pixels 105 are repeatedly arranged from i=1 to i=m by turns in the order of Red, Green, Blue, and White.

In a similar way as the first exemplary embodiment, in this exemplary embodiment, the positions of the TFT light-shielding parts 1a in the pixels 105 are different in the odd and even columns, thus the kinds of the colorants 3 shall be four, which is an even number. Accordingly, the shape of the aperture area 2 periodically changes by the unit of two columns, whereas the kinds of the colorant 3 periodically changes by the unit of four columns, which is a multiple of the two columns. Therefore, the shapes of all the aperture areas 2 in which the same color colorants 3 are placed are the same. Then, at the time of the single color display, the shapes of the aperture areas 2 of the displayed pixels 105 can be the same.

Figure 6:
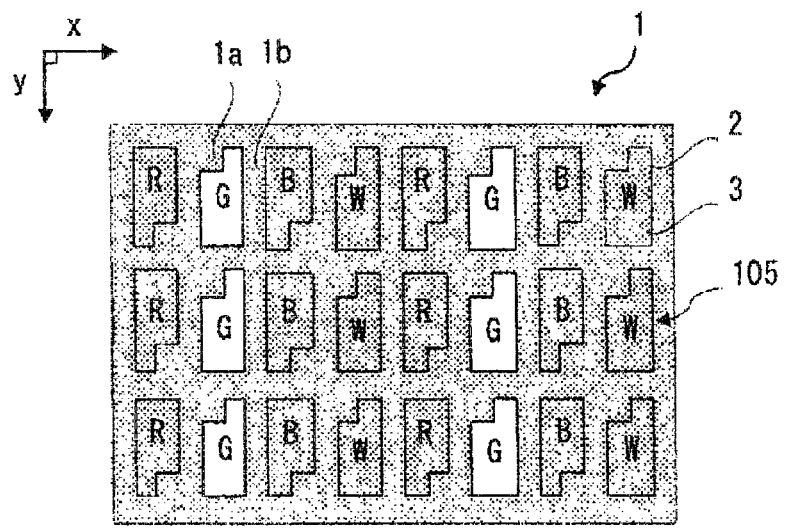
FIG. 6 is a plan view showing a configuration of the BM and the colorants for explaining a single color display state of Green according to the second exemplary embodiment.

FIG. 6 is a plan view showing a configuration of a BM 1 and the colorants 3 for explaining the single color display state of Green. In FIG. 6, the pixels 105 displayed at the time of the single color display are shown in white. As shown in FIG. 6, the pixels of the second and sixth columns are displayed. That is, the pixels 105 of the odd columns are not displayed and only the pixels 105 of the even columns are displayed. Therefore, all the shape of the aperture area 2 of the pixel 105 displayed will the same. Accordingly, the positions of all the TFT light-shielding parts 1a in the displayed pixels 105 will be the same. Therefore, the oblique streak becomes hardly visible, and thereby improving the display quality.

Further, by using the White colorant 3 with higher transmissivity than Yellow, Cyan, and Magenta in the first exemplary embodiment, higher transmissivity can be achieved. Furthermore, light passed through the White colorant 3 with higher transmissivity than Red, Green, and Blue can be used. Therefore, white with higher luminance can be obtained easier as compared to the case of using the color filters of common Red, Green, and Blue. Moreover, as the colorants 3 used are Red, Green, Blue, and White, the color reproducibility of common Red, Green, and Blue can be achieved. Only the luminance information may be separated from the video signals using the color signals for each of usual Red, Green, and Blue in order to generate White signals to be added. Thus it is simpler than generating color signals of six colors.

Although the above first and second exemplary embodiments used the example of six and four colors (three colors and White) as an example in which the number of the kinds of the colorants 3 is even, the present invention is not limited to this. For example, it may be two colors, four colors such as a combination of Red, Green, Cyan, and Magenta not including White, or an even number of colors of eight or more as a special purpose. Even in such a case, the oblique streak can be less visible as in the first and second exemplary embodiments.

In the first and second exemplary embodiments of the above explanation, although the position of the TFT 106 in the pixel 105 periodically changes by the unit of two columns, but it is not limited to this. That is, the position of the TFT 106 in the pixel 105 may change periodically by the unit of k columns (k is an integer of two or greater). For example, in FIG. 1, the pixels 105 of the third, seventh . . . columns are connected to the first gate line 107a, and the pixels 105 of the fourth, eighth . . . columns are connected to the second gate line 107b. Further, instead of periodically changing the positions of the TFTs 106 in the pixels 105 by the unit of two columns, the following constitution may be adopted. That is, the positions of the TFTs 106 may be periodically changed by the unit of four columns which is even. In other words, the TFTs 106 may be brought into proximity of the first gate line 107a and the second gate line 107 every two columns. Even in this case, by providing the same color colorants 3 to the aperture areas 2 of the same shape, the luminance nonuniformity, which is generated by the periodical change of the shapes of the aperture areas 2 and has a particular pattern, is hard to perform viewing. For example, the number of the colors of the colorants 3 may be four colors (three colors and White) as with the second embodiment, to be a multiple of four, and the colors of the colorants 3 may be periodically changed by the unit of the columns corresponding to the number of the colorant 3. Further, in the case that the position of the TFT 106 in the pixel 105 has other cycles, the number of colors of the colorants 3 may be multiples of the number k of cycles of the position of the TFT 106, so that the color of the colorants may be periodically changed by the unit of columns corresponding to the number of colors.

Third Exemplary Embodiment

Figure 7:
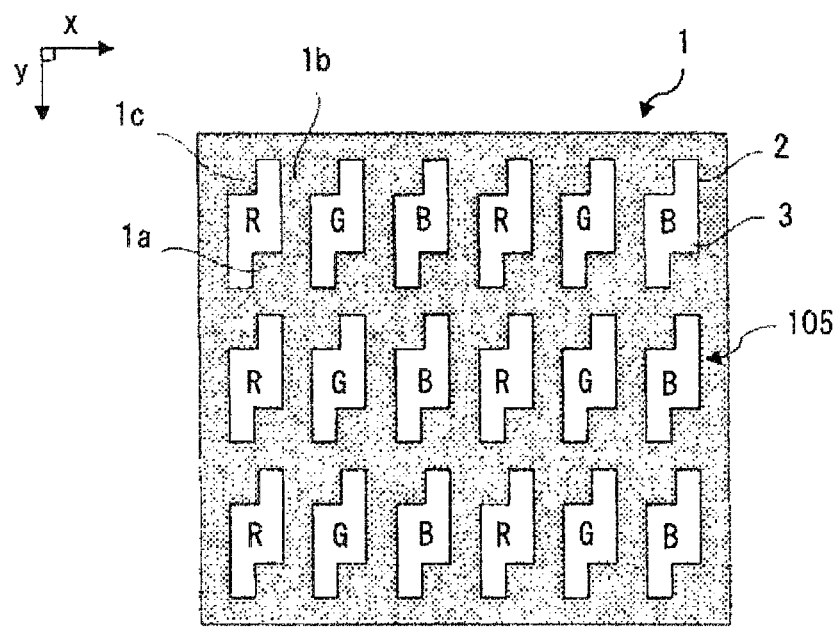
FIG. 7 is a plan view showing a configuration of a BM and colorants according to a third exemplary embodiment.

In the first and the second exemplary embodiments, luminance nonuniformity of a particular pattern such as an oblique stream is made less visible using the number of colors of the colorants 3 that corresponds to multiples of k, so as to prevent from placing the same color colorants 3 in the aperture areas 2 with different shapes. In this exemplary embodiment, the shape of the aperture area 2 of a BM 1 is unified for all the pixels 105. A liquid crystal display according to this exemplary embodiment is explained with reference to FIG. 7. FIG. 7 is a plan view showing a configuration of the BM 1 and colorants 3.

As shown in FIG. 7, the shapes of the aperture areas 2 are the same in all the pixels 105. The positions of the TFT 106 in the pixel 105 are different in the even and odd columns as well as the first and second exemplary embodiments. In order to have the same shapes of the aperture areas 2 of all the pixels 105, an aperture area shape adjusting light-shielding part 1c is further included in the BM 1. The aperture area shape adjusting light-shielding part 1c is placed to correspond to the positions of the TFTs 106 in the pixels 105 of other columns. Then the shapes of all the aperture areas 2 will be the same, and it is possible to shield from light on the TFTs 106 with different positions in the pixels 105.

For example, in a pixel (1, 1) shown in FIG. 7, the TFT light-shielding part 1a is placed to the position corresponding to the TFT 106. In the pixel (1, 1), the aperture area shape adjusting light-shielding part 1c is placed to adjust the shape of the aperture area 2 even in the region which is not normally requires light shield. In a pixel (2, 1), the position of the aperture area shape adjusting light-shielding part 1c corresponds to that of the TFT light-shielding part 1a in the pixel (1, 1). Similarly, in the pixel (2, 1), the position of the TFT light-shielding part 1a corresponds to that of the aperture area shape adjusting light-shielding part 1c in the pixel (1, 1). Thus, the shapes of the aperture areas 2 are the same for the pixels (1, 1) and (2, 1).

As explained in the first exemplary embodiment, in the liquid crystal display of the double scanline style, the positions of the TFTs 106 in the pixels 105 varies from column to column, and the region to shield the TFT part from light also varies from column to column. Accordingly, if there is no aperture area shape adjusting light-shielding part 1c, the shapes of the aperture areas 2 varies from column to column. As a result, in the related art, the shapes of the aperture areas 2 in the pixels 105 displayed at the time of the single color display state are different, and the oblique streak has been displayed. Therefore, in this exemplary embodiment, the shapes of all the aperture areas 2 are made to be the same. Thus the abovementioned problem is not generated, the oblique streak becomes less visible, and thereby improving the display quality.

In this exemplary embodiment, since the shapes of the aperture areas 2 are the same, an exemplary advantage can be achieved even if the number of the kinds of the colorants 3 is odd. For example, three colors colorants 3, which are Red, Green, and Blue, can be used. Specifically, the color filters of common Red, Green, and Blue can be used, thus it is easier to manufacture the color filters than the first and second exemplary embodiments. Moreover, color reproducibility of common Red, Green, and Blue can be achieved. Additionally, it is simple as video signals using normal color signals for each of Red, Green, and Blue can be used without conversion.

Fourth Exemplary Embodiment

Figure 8:
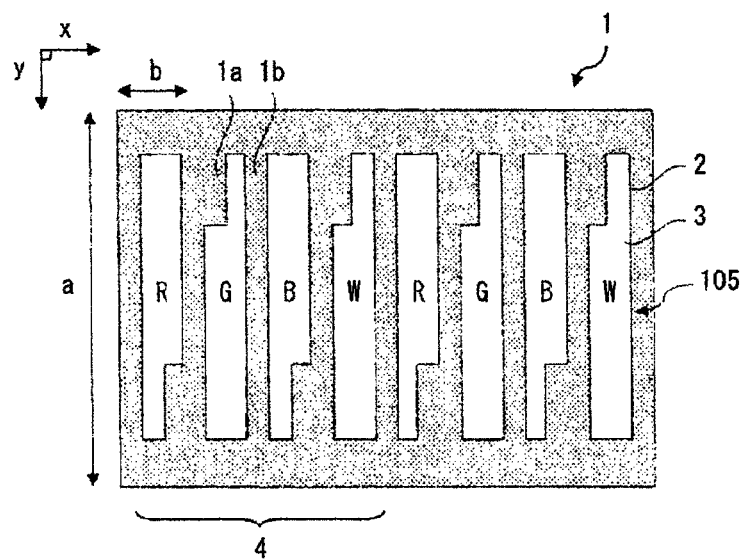
FIG. 8 is a plan view showing a configuration of a BM and colorants according to a fourth exemplary embodiment.
Figure 9:
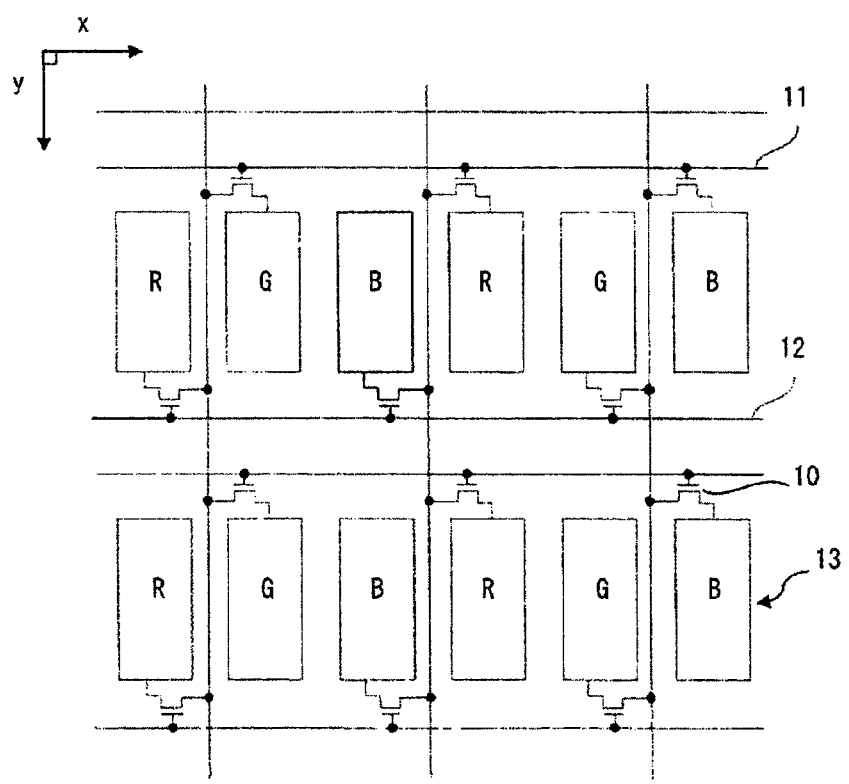
FIG. 9 is a schematic circuit diagram showing a circuit configuration of a liquid crystal display according to a related art.

In this exemplary embodiment, the lengths of the long and short sides of the pixel 105, which is a substantially rectangular shape, are adjusted according to the number of colors of the colorant 3. A liquid crystal display according to this exemplary embodiment is explained with reference to FIG. 8. FIG. 8 is a plan view showing a configuration of a BM 1 and colorants 3. In FIG. 8, although the pixels 105 for one row are illustrated, the pixels 105 composing multiple rows are placed in practice.

In this exemplar embodiment, the ratio of the lengths of the long and short sides of the pixel 105 shall be [number of colors]:1. Accordingly, a picture element 4 composed of the pixels 105 for the number of colors will be substantially square. In FIG. 8, the colorants of four colors, which are Red, Green, Blue, and White, are used. Therefore, as shown in FIG. 8, it is [the length of the long side a]:[the length of the short side b]=4:1. Accordingly, the ratio of the length of the pixel 105 in the y-axis direction to the length of the pixel 105 in the x-axis direction shall be 4:1. Therefore, the picture element 4 composed of four aligned pixels 105 in the short side direction (x-axis direction) will be substantially square.

As mentioned above, four or more colors may be used especially in the first and the second exemplary embodiments. In this exemplary embodiment, even if there are many colors, the picture element 4 composed of the pixels 105 for the number of colors can be substantially square. Therefore, the display is not dull laterally and the display can be natural.

The present invention is not limited to the above exemplary embodiments, but can be modified as appropriate without departing from the scope of the present invention. The above-mentioned first to the fourth exemplary embodiments can be combined.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display device comprising:
   a plurality of pixels that are arranged in a matrix;
   a switching device that is placed in the pixel, the switching device including two or more kinds of positions in the pixel, and the position being common in each column;
   a light-shielding film including an aperture area and a switching device light-shielding part placed to counter the switching device in the pixel; and
   a colorant that is placed in the aperture area, the colorant including two or more kinds of colors, and the color being common in each column,
   wherein a shape of the aperture area in which the same color colorant is placed is the same in both a column direction and a row direction for all of the two or more kinds of colors.

2. The display device according to claim 1, wherein
   the light-shielding film further comprises an aperture area shape adjusting light-shielding part that is placed to correspond to the position of the switching device in the pixel of a different column, and
   a shape of the aperture area is same in all the pixels.

3. The display device according to claim 1, wherein
   the pixel has a substantially rectangular shape, and
   a ratio of lengths of a long side and a short side of the pixel is generally [the number of colors]: 1.

4. A display device comprising:
   a plurality of pixels that are arranged in a matrix;
   a switching device that is placed in the pixel, the switching device including two or more kinds of positions in the pixel, and the position being common in each column;
   a light-shielding film including an aperture area and a switching device light-shielding part placed to counter the switching device in the pixel; and
   a colorant that is placed in the aperture area, the colorant including two or more kinds of colors, and the color being common in each column,
   wherein a shape of the aperture area in which the same color colorant is placed is the same, wherein
   the position of the switching device in the pixel periodically changes by a unit of k columns (k is an integer of two or greater), and
   a number of the kinds of the color of the colorant is in multiples of k.

5. The display device according to claim 4, wherein the colorant has six kinds, which are Red, Green, Blue, Yellow, Cyan, and Magenta.

6. The display device according to claim 4, wherein the colorant has four kinds, which are Red, Green, Blue, and White.

7. The display device according to claim 4, wherein
   the pixel has a substantially rectangular shape, and
   a ratio of lengths of a long side and a short side of the pixel is generally [the number of colors]: 1.

* * * * *